United States Patent [19]

Garde

[11] Patent Number: 5,080,861

[45] Date of Patent: Jan. 14, 1992

[54] CORROSION RESISTANT ZIRCONIUM ALLOY

[75] Inventor: Anand M. Garde, West Simsbury, Conn.

[73] Assignee: Combustion Engineering, Inc., Windsor, Conn.

[21] Appl. No.: 543,020

[22] Filed: Jul. 25, 1990

[51] Int. Cl.$^5$ ............................................. C22C 16/00
[52] U.S. Cl. ............................... 420/422; 148/11.5 F; 148/133; 148/407
[58] Field of Search ................ 420/422; 148/11.5 F, 148/407, 133

[56] References Cited

U.S. PATENT DOCUMENTS

| | | | |
|---|---|---|---|
| 2,872,310 | 2/1959 | Wilhelm et al. | 75/177 |
| 3,963,534 | 6/1976 | Frenkel et al. | 148/11.5 F |
| 4,775,508 | 10/1988 | Sabol et al. | 420/422 |
| 4,863,685 | 9/1989 | Taylor | 420/422 |
| 4,876,064 | 10/1989 | Taylor | 420/422 |
| 4,879,093 | 11/1989 | Garde | 420/422 |
| 4,963,316 | 10/1990 | Stehle et al. | 420/422 |

FOREIGN PATENT DOCUMENTS 3805124 8/1989 Fed. Rep. of Germany.
2602368 2/1988 France.

OTHER PUBLICATIONS

Garzarolli et al., Proc. IAEA Symp., Stockholm, Sep. 1986, pp. 387–407.
Garde, Paper for 9th ASTM Symp. on Zirconium in Nuclear Industry, Kobe, Japan, Nov. 1990.
Vest et al., Jour. Am. Cer. Soc., 47, (1964), 625.
Kearns, Jour. Nucl. Mat., 22, (1967), 292.
Hansen et al., "Antimony-Zirconium Phase Diagram", McGraw-Hill, 1958, pp. 1185–1186.
Russi et al., U.S. AEC Pub. #AECD-3610, 1951.
Weinstein et al., Rept. IITRI-198-43, 1963.
Parker et al., USAEC Report Apex-561, GE, Dec. 1959.
Lanning et al., in 8th Intn. Symp., ASTM-STP-1023, (eds), Van Swain et al., Philadelphia, 1989, pp. 3–19.
Parfenov et al., AEC-Tr-6978-UC-25, Jerusalem, 1969, pp. 119, 72, and 32.
Erickson et al., J. Nucl. Mater., 13, (1964), 254.

*Primary Examiner*—Upendra Roy
*Attorney, Agent, or Firm*—John H. Mulholland

[57] ABSTRACT

An improved corrosion resistant ductile modified zirconium alloy for extended burnups in water-moderated nuclear reactor core structural components, fuel cladding and analogous corrosive environment uses is provided. It comprises:

measurable amounts of niobium in a range up to 0.6 percent by weight, measurable amounts on antimony in a range up to 0.2 percent by weight, measurable amounts of tellurium in a range up to 0.2 percent by weight, tin in the range 0.5 to 1.0 percent by weight, iron in the range 0.18 to 0.24 percent by weight, chromium in the range 0.07 to 0.13 percent by weight, oxygen in the range of from 900 to 2,000 ppm, nickel in an amount less than 70 ppm, carbon in an amount less than 200 ppm and the balance zirconium and minor amounts of impurities.

The alloy structure is substantially alpha phase with some precipitated second phase particles which are preferably within the size range of 1200 to 1800 angstroms. Bismuth may be substituted for part of either or both of the elements antimony or tellurium in a range up to 0.2 percent by weight of bismuth.

3 Claims, No Drawings

CORROSION RESISTANT ZIRCONIUM ALLOY

BACKGROUND OF THE INVENTION

1. Field of the Invention

The invention relates to corrosion resistant zirconium alloys for extended burnups in water-moderated nuclear reactor core structural components and fuel cladding but which also may find utility in zirconium alloys for other analogous corrosive environment uses.

2. Description of the Prior Art

In my previous invention of a DUCTILE IRRADIATED ZIRCONIUM ALLOY, U.S. Pat. No. 4,879,093, an improved ductile zirconium-tin (Zircaloy) —niobium or molybdenum alloy for use in water moderated nuclear reactor core structural components and fuel cladding is disclosed. Because of that invention, longer in-reactor residence times and extended fuel burnup—above 55 GWD/MTU—were made practical because the alloy's stabilized microstructure minimized loss of alloy ductility. The improved ductility is required to resist release of fission gases and to handle spent fuel safely. That alloy retained reasonable corrosion resistance because of its primarily alpha phase structure and optimum intermetallic precipitate average particle size. Improvement of in-reactor corrosion resistance of zirconium alloys at extended burnups is still an area of technology with "room for improvement", however.

There are several possible approaches or objectives to enhance corrosion resistance at extended burnups for structural components and fuel cladding of water-moderated nuclear reactors, (a term used generically for PWR, BWR and PHWR). They are generally listed as follows:

1. Decrease the hydrogen adsorbed at the water-oxide interface;
2. For a given amount of hydrogen adsorbed in the oxide, slow its diffusion toward the metal substrate;
3. Create higher hydrogen solubility in the metal substrate to reduce precipitation;
4. Reduce the percentage fraction of hydrogen which is absorbed by the metal substrate; and,
5. Decrease the basic oxidation rate of the metal substrate to avoid degradation of the metal substrate's corrosion resistance.

An understanding of these approaches or objectives, and a recognition that in-reactor corrosion resistance of zirconium alloys at extended burnups is degraded due to the fracture of hydride precipitates at the metal-oxide interface, has led to the present invention of a corrosion resistant zirconium alloy for use in water moderated nuclear reactors.

SUMMARY OF THE INVENTION

To minimize corrosion accelerated by fracture of hydride precipitates at the metal-oxide interface in zirconium alloy nuclear reactor core structural components and fuel cladding, an alloy has been invented which helps to sustain coherency at the interface to maintain protective capability of the barrier oxide layer. The novel feature of the invention is the addition of both antimony (Sb) and tellurium (Te) to a predominantly single-phase, niobium-modified zirconium alloy. The additions reduce the hydrogen uptake by the zirconium and also delay hydride precipitation. The coherency at the metal-oxide interface is maintained during longer burnups and therefore the alloy has superior corrosion resistance at high burnups.

The zirconium alloy for enhancing in-reactor corrosion resistance at extended burnups in PWR, BWR and PHWR comprises: measurable amounts of niobium in a range up to 0.6 percent by weight, measurable amounts of antimony in a range up to 0.2 percent by weight, measurable amounts of tellurium in a range up to 0.2 percent by weight, tin in the range 0.5 to 1.0 percent by weight, iron in the range 0.18 to 0.24 percent by weight, chromium in the range 0.07 to 0.13 percent by weight, oxygen in the range of from 900 to 2,000 ppm, nickel in an amount less than 70 ppm, carbon in an amount less than 200 ppm and the balance zirconium and minor amounts of impurities.

The zirconium alloy elements within the ranges selected produce a zirconium alloy structure which is substantially alpha phase with some precipitated second phase particles which are preferably controlled within the size range of 1200 to 1800 angstroms.

DESCRIPTION OF THE PREFERRED EMBODIMENTS

The degradation of corrosion resistance of nuclear fuel cladding at extended burnup is associated with the loss of coherency at the oxide-metal interface due to the failure of brittle hydrides, precipitated at the interface, resulting from the corrosion induced stresses.

Therefore, the corrosion resistance of zirconium alloys at extended burnups is enhanced by the following factors:

1. A decrease in the hydrogen absorption by the metal;
2. An increase in the hydrogen solubility in the alpha phase, this will decrease the amount of precipitates;
3. The alloy composition chosen from the ranges permitted should result in a predominantly single phase microstructure, this will a) enhance the corrosion resistance by maintaining coherency at the metal substrate-barrier oxide layer interface and b) enhance fabricability-workability of the component by the absence of coarse brittle second phase particles; and, 4. Adding alloying elements that are also soluble in zirconium oxide such that oxide will be able to sustain coherency (second phase particle precipitation in the oxide phase will make it difficult to sustain large distortions in the barrier oxide layer necessary to maintain its protective nature).

The invention involves small additions of Sb and Te which achieve most of the factors listed above. Before discussing the effect of these novel additions, let us describe the corrosion model used to evaluate the effect of these additions.

The fuel cladding corrosion model, which forms the basis of this new alloy is described below (see FIG. 1). The reactions occurring at different locations are as follows:

1. At the water-oxide (steam) interface, a water molecule reacts with an anion vacancy $\square^{++}$ in the oxide lattice and two electrons to form oxygen $O^{--}$ and hydrogen $H^+$ ions.
2. The hydrogen ions so generated can either form a hydrogen molecule and get discharged into the coolant or are adsorbed on the oxide surface.

2a. The formation of $H_2$ molecule will be enhanced if the boiling action (voids) exists on the oxide surface or if the oxide surface temperature is close to 500° C. when the hydrogen surface adsorption will be less compared to lower temperatures.

2b. Hydrogen adsorption on the oxide surface will be enhanced if a) a single phase (water or steam) exists on the surface with no two phase boiling and b) if the oxide contains a catalyst element (such as nickel) that enhances the nascent hydrogen adsorption on the oxide surface and c) the surface temperature is significantly less than 500° C. so that adsorption is possible.

3. Transport of $H^+$ and $O^{--}$ ions from the water-oxide interface to the metal-oxide interface and the transport of $\Box^{++}$ and $e^-$ in the opposite direction.

These transports are influenced by a) the composition of oxide, b) structure of the oxide and c) temperature of oxide. The composition of oxide controls, the $O^{--}$ and $H^+$ diffusion rate through the oxide. Addition of tin to the oxide containing nitrogen reduces the oxygen diffusion through the oxide and thereby enhances the corrosion resistance of zirconium alloys containing nitrogen impurity. With a high hydrogen ingress towards the metal [e.g., PWR corrosion (low or no void fraction and hydrogen overpressure) or 360° C. water autoclave corrosion], the partial pressure of oxygen in the oxide layer is low and under these conditions, the zirconium oxide is a n-type semiconductor. With a low hydrogen ingress towards the metal [e.g., BWR corrosion (high void fraction) or 500° C. steam autoclave test (low adsorption of hydrogen on oxide surface due to high temperature)], zirconium oxide is a p-type semiconductor. As a result, the effect of alloying element on the $O^{--}$ and $H^+$ diffusion through oxide under PWR & BWR conditions are different.

The structure of the external (close to the water medium) oxide layer is porous with stable stoichiometric oxide. Diffusion of oxygen through this layer is fast and this part of the oxide is non-protective. The inner "barrier" oxide layer is sub-stoichiometric, strained and is coherent with the substrate metal. This is the "protective" oxide layer. Diffusion of $O^{--}$ and $H^+$ through the protective barrier layer controls the corrosion rate of the cladding. As the barrier layer temperature increases, the diffusion of $O^{--}$ and $H^+$ through this layer increases and thereby the corrosion rate increases.

4. Underneath the barrier oxide layer, oxygen ions react with zirconium forming the new oxide.

5. The hydrogen ions diffused through the barrier layer react with zirconium. After exceeding the hydrogen solubility in zirconium [which is limited to about 80 ppm at 300° C., the reactor operating temperature] zirconium hydrides are precipitated.

Hydrogen has a tendency to migrate towards cooler parts of the zirconium alloy components. Because of imposed heat flux on a fuel cladding in the reactor, the coolest part of the cladding is adjacent to the barrier oxide layer. As a result, the hydrides are concentrated next to the barrier layer. This is not the case for inreactor components without an imposed heat flux or in isothermal autoclave operation and hydrides are uniformly distributed in the cross-section.

The zirconium hydride is a brittle phase at temperatures lower than 427° C. and above this temperature the zirconium hydride phase exhibits some ductility. Therefore, for metal-oxide interface temperatures less than 427° C., the brittle zirconium hydride phase cannot withstand the tensile strain imposed on the substrate metal by the newly forming zirconium oxide (Zr to $ZrO_2$ reaction involves a 56% expansion) and the hydride fractures. Such fracture of $ZrH_2$ destroys the coherency at the metal-oxide interface, thereby, decreases the "protective" nature of the barrier oxide layer which results in an increased corrosion rate. This is probably the reason for the enhanced in-PWR corrosion observed with hydrogen uptake close to the solubility limit, the so called "thick-film" hypothesis proposed by Johnson in D. D. Lanning, A. B. Johnson, Jr., D. J. Trimble and S. M. Boyd, "Corrosion and Hydriding of N Reactor Pressure Tubes", Zirconium in the Nuclear Industry: Eighth International Symposium, ASTM STP 1023, L. F. P. Van Swam and C. M. Eucken Eds., American Society for Testing and Materials, Philadelphia, 1989, pp 3-19.

For metal-oxide interface temperatures greater than 420° C., the hydride phase is ductile and with increasing temperatures it can withstand the strains imposed by the oxide layer more effectively. Therefore, zirconium hydride precipitates are not principal reasons for corrosion rate enhancement at higher temperatures (>420° C.).

The long-term (>300 days) rate transition observed in an autoclave corrosion test is also related to the hydride precipitation. However, due to the absence of the heat flux, hydride precipitation does not preferentially occur near the metal-oxide interface. Long autoclave times are necessary to charge the entire tube wall cross-section to observe the effect of brittle hydrides on the coherency of the metal-oxide interface.

Using the foregoing and the corrosion model it will be understood that the addition of Sb and Te in measurable amounts up to 0.2 percent by weight of each will decrease the hydrogen uptake by zirconium. This is mainly due to less hydrogen adsorption on the oxide surface. The catalytic properties of different elements depend on the filling of d- and s-shells in the atom. On the basis of correlation between the atomic electronic shell structure and its anti-catalytic properties (i.e., less hydrogen adsorption on the oxide surface), it is determined that both Sb and Te are good anti-catalytic elements to be added to zirconium oxide to reduce the hydrogen adsorption on the oxide surface. With lower hydrogen adsorption, the hydrogen concentration gradient across the oxide is smaller. This leads to lower hydrogen charging of the zirconium alloy cladding material.

The addition of the antimony is known to increase the hydrogen solubility in zirconium alloys. Since antimony has significant solubility in alpha zirconium, i.e., about 1.9 wt%, small additions of Sb will not result in the precipitation of a new phase which could be detrimental to the corrosion resistance and fabricability of the alloy. The addition of tellurium is for the purpose of enhancing the solubility of Sb in zirconium oxide. The ionic radius of pentavalent Sb is about 25% smaller than that of zirconium. This difference is greater than the maximum 15% difference for extensive solid solubility. The quadravalent tellurium ion has ionic radius of 10% greater than that of zirconium. The presence of both tellurium and antimony creates an ionic size difference conducive to the solid solubility of both elements in the zirconium oxide. Similarly, it is believed that measurable amounts of up to 0.2 percent by weight of bismuth (Bi) will be a substantial equivalent for either the antimony or the tellurium in the novel zirconium alloy system disclosed and claimed herein and therefore it may be substituted for all or part of either of these elements (Sb or Te) in the alloy. The addition of small amounts of Te to the binary alloys zirconium-tin, zirconium-niobium and zirconium-chromium are known to have had beneficial effect on the corrosion resistance of these alloys in 360° C. water autoclave tests.

The addition of Sb and Te together will enhance the solubility of both elements in the oxide layer. The enhanced solubility of Sb and Te in oxide will maintain the oxide homogeneous single phase which will enhance the corrosion resistance.

The other alloying elements by percent weight or PPM and the purpose of their addition are as follows:

0.5 to 1.0% tin (Sn), to negate the bad effect of nitrogen on the corrosion resistance of the alloy, to achieve some solid solution hardening;

up to 0.5% niobium (Nb), to decrease hydrogen uptake by the metal and to provide both the solid solution hardening and irradiated ductility at high burnups;

0.18–0.24% iron (Fe), high temperature corrosion resistance;

0.07–0.13% chromium (Cr), high temperature corrosion resistance;

up to 2000 ppm oxygen (O), solid solution hardening;

50–200 ppm silicon (Si), to lower the hydrogen absorption by the metal;

less than 200 ppm of carbon (C), to limit the in-reactor growth and extent of corrosion; and, the balance zirconium (Zr) and minor amounts of impurities for its low neutron cross-section.

While selecting the levels of different elements listed above, an attempt was made to keep the zirconium alloy as close to single phase (alpha phase) as possible. With the added elements also having reasonable solubility in zirconium oxide. Nevertheless, some second phase particles will precipitate. In order to achieve optimum resistance to both uniform and nodular corrosion in PWR and BWR conditions, respectively, the second phase particle size shall be controlled to be in the range of 1200 to 1800 angstroms.

Thus, it will be seen that by utilizing the zirconium alloy as taught herein, an improved corrosion resistance for extended burnup in water-moderated nuclear reactors is provided.

A typical example of the alloy in percent by weight or parts per million follows: tin, 0.7 percent; niobium, 0.5 percent; iron, 0.24 percent; chromium, 0.10 percent; oxygen, 1800 ppm; silicon, 80 ppm; nickel, less than 35 ppm; carbon, 80 ppm; and the balance zirconium and minor amounts of impurities.

I claim:

1. An improved corrosion resistant ductile modified zirconium alloy for extended burnups in water-moderated nuclear reactor core structural components, fuel cladding and analogous corrosive environment uses which comprises:

measurable amounts of niobium in range up to 0.6 percent by weight, measurable amounts of antimony in a range up to 0.2 percent by weight, measurable amounts of tellurium in a range up to 0.2 percent by weight, tin in the range of 0.5 to 1.0 percent by weight, iron in the range 0.18 to 0.24 percent by weight, chromium in the range 0.07 to 0.13 percent by weight, oxygen in the range of from 900 to 2,000 ppm, nickel in an amount less than 70 ppm, carbon in an amount less than 200 ppm and the balance zirconium and minor amounts of impurities, said zirconium alloy structure being substantially alpha phase with some precipitated second phase particles.

2. The improved corrosion resistant zirconium alloy of claim 1 in which the second phase particles precipitated are within the size range of 1200 to 1800 angstroms.

3. The improved corrosion resistant zirconium alloy of claim 1 in which the element bismuth is substituted for part of either or both of the elements antimony or tellurium in a range from a measurable amount up to 0.2 percent by weight of bismuth.

* * * * *